United States Patent [19]

DiGregorio

[11] Patent Number: 4,854,036

[45] Date of Patent: Aug. 8, 1989

[54] APPARATUS FOR ASSEMBLING MAGNETIC TAPE DRIVE READ/WRITE HEAD MODULES

[75] Inventor: Germano DiGregorio, Arvada, Colo.

[73] Assignee: Storage Technology Corporation, Louisville, Colo.

[21] Appl. No.: 231,826

[22] Filed: Aug. 12, 1988

[51] Int. Cl.$^4$ ................................................. G11B 5/42
[52] U.S. Cl. ........................................ 29/744; 29/467; 29/468; 29/603; 29/759
[58] Field of Search ................. 29/603, 467, 468, 744, 29/759

[56] References Cited

U.S. PATENT DOCUMENTS 4,782,581 11/1988 Katz et al. ............................ 29/603

Primary Examiner—Carl E. Hall
Attorney, Agent, or Firm—Dorr, Carson, Sloan & Peterson

[57] ABSTRACT

The apparatus and method for assembling magnetic tape drive read/write head modules of the present invention uses an assembly fixture that enables a worker to completely assemble and align the read/write head module in a single step process. This is accomplished by providing an assembly fixture that securely holds the rectangular shaped read/write head frame in a fixed position. A read head and write head alignment tool is pivotally attached to the assembly fixture for magnetically suspending the read head and write head in the rectangular shaped opening in the read/write head frame in a predetermined position. This alignment tool includes an aperture such that the worker can view the transducing gaps on the read head and the write head for alignment purposes. Two sets of threaded rods are included in this assembly apparatus to modify the lateral position of the read head and the write head such that the transducing gaps on these two heads are in exact alignment with respect to each other. Once the alignment process is completed, a leaf spring is inserted between one inner wall of the rectangular shaped read/write head frame and the read/write heads and the read and write heads are adhesively secured to each other to maintain the alignment of their transducing gaps.

10 Claims, 4 Drawing Sheets

APPARATUS FOR ASSEMBLING MAGNETIC TAPE DRIVE READ/WRITE HEAD MODULES

FIELD OF THE INVENTION

This invention relates to magnetic tape drive read/write head modules and, in particular, to an apparatus and method for efficiently assembling these modules.

PROBLEM

It is a problem in the field of magnetic tape drives to assemble the read/write head modules with precise alignment and in a timewise efficient manner. In a magnetic tape drive, the read/write head module consists of a substantially rectangular shaped frame that has a rectangular shaped opening therein into which is placed the read head and the write head. The read and write heads each have a multiplicity of discrete transducing gaps aligned along one face of the head. In the read/write head module, the read head and write head are placed adjacent to each other and the transducing gaps on each of these heads must be exactly aligned so that corresponding transducing gaps on the read head and write head align with a single data storage track on the magnetic tape in the tape drive.

In order to obtain precise alignment of the transducing gaps in the read head and the write head, the read/write head module is assembled in a two step process. Typically the first step of the process is to place the read head and the write head side by side in an assembly fixture where the position of the read and write heads are adjusted so that the respective transducing gaps on the read and write heads are in exact alignment. In addition, the relative vertical alignment of the read head and write head are adjusted so that the face that contains the transducing gaps on the read and write heads are coplanar so that the magnetic tape comes evenly in contact with both the read head and the write head. Once the exact alignment of the read head and write head is accomplished in this assembly fixture, the read and write heads are interconnected by the use of an adhesive to retain the alignment obtained in this assembly step. Once the adhesive has cured, the read/write heads are removed from this assembly fixture and placed in the rectangular shaped opening the read/write head frame. A leaf spring is inserted between the read/write heads and one inner wall of the rectangular shaped read/write head frame such that the adhesively interconnected read/write heads are pressed against the opposite inner wall of the rectangular shaped read/write head frame. The tension of this leaf spring is varied by the use of an adjustable screw that is movable within a threaded aperture through the wall of the rectangular shaped read/write head frame. This screw bears on the center of the convex surface of a leaf spring to vary the amount of force the leaf spring places on the read/write heads as they are forced against the opposite inner wall of the rectangular shaped read/write head frame.

The above described two step assembly process is both labor intensive and expensive. The necessity to precisely align the respective transducing gaps on the read and write heads as well as the need to provide a precisely controlled clamping force to exactly align the read/write heads within the rectangular shaped read/write head frame all require significant manual intervention by a worker. The result is that the magnetic tape read/write head modules are expensive devices due to the precision alignment requirements of these modules.

SOLUTION

The above described problems are solved and a technical advance achieved in the field by the apparatus and method for assembling magnetic tape drive read/write head modules of the present invention. The two step assembly process of the prior art is replaced by an assembly fixture that enables a worker to completely assemble and align the read/write head module in a single step process. This is accomplished by providing an assembly fixture that securely holds the rectangular shaped read/write head frame in a fixed position. A read head and write head alignment tool is pivotally attached to the assembly fixture for suspending the read head and write head in the rectangular shaped opening in the read/write head frame in a predetermined position. This alignment tool consists of two parallel arms, each of which includes a magnet to magnetically suspend the read head and write head from the bottom of this tool. The worker places the read head and the write head on the magnets located on these two parallel arms and then rotates this alignment tool such that the parallel arms are placed in position juxtaposed with two opposite inner walls of the rectangular shaped read/write head frame such that the read head and the write head are suspended in a predefined position within the rectangular shaped opening in the read/write head frame. This alignment tool includes an aperture such that the worker can view the transducing gaps on the read head and the write head for alignment purposes.

Two threaded rods are included in this read/write head module assembly apparatus. The pair of threaded rods are positioned at the ends of the read and write heads, such that they can be used to modify the lateral position of the read head and the write head with respect to the inner walls of the rectangular shaped read/write head frame. By use of the threaded rods, the worker can adjust the relative position of the read head and the write head such that the transducing gaps on these two heads are in exact alignment with respect to each other. The magnets in the parallel arms of the alignment tool maintain the read and write heads in coplanar alignment so that adjustment in all three dimensions is precisely provided. Once the alignment process is completed, a leaf spring is inserted between one inner wall of the rectangular shaped read/write head frame and the read/write heads. An adjusting screw is inserted through a threaded aperture in the wall of the rectangular shaped read/write head frame such that it can be used to adjust the clamping force provided by the leaf spring on the read/write heads. Once the leaf spring is in position and properly adjusted, the worker can apply an adhesive to the read and write heads such that they are secured to each other to maintain the alignment of their transducing gaps. The leaf spring provides continued alignment of the read/write heads with respect to the inner wall of the rectangular shaped read/write head frame.

Thus, this apparatus enables the worker to assembly the magnetic tape drive read/write head modules in a single operation. This apparatus provides precise alignment of the transducing gaps of the read head and write head while also maintaining the top surface of the read and write heads in a coplanar orientation. The use of this apparatus reduces the labor content in the assembly process yet maintains the precision required in the alignment of these heads, thereby significantly reducing the cost of producing the magnetic tape drive read/write head modules. These and other features and advantages of this invention will be ascertained by a reading of the following detailed description.

DETAILED DESCRIPTION OF THE DRAWING

Figure 1:
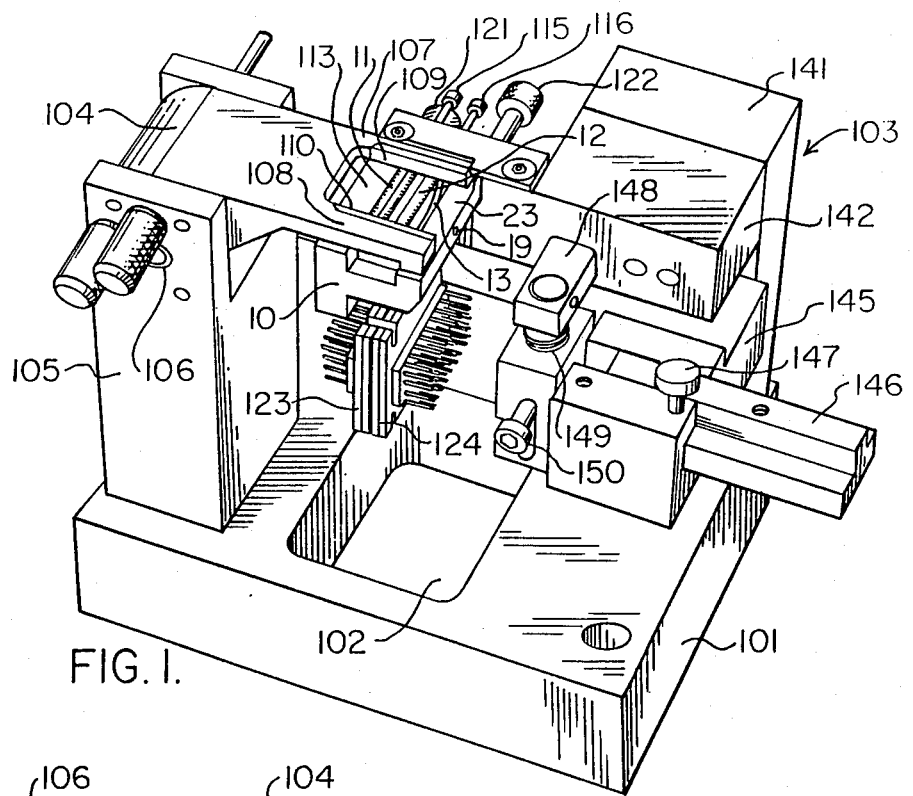
FIG. 1 illustrates the magnetic tape drive read/write head module assembly apparatus in perspective view.

It is a problem in the field of magnetic tape drives to assemble the read/write head modules with precise alignment and in a timewise efficient manner. In a magnetic tape drive, the read/write head module consists of a substantially rectangular shaped frame that has a rectangular shaped opening therein into which is placed the read head and the write head. The read and write heads each have a multiplicity of discrete transducing gaps aligned along one face of the head. In the read/write head module, the read head and write head are placed adjacent to each other and the transducing gaps on each of these heads must be exactly aligned so that corresponding transducing gaps on the read head and write head align with a single data storage track on the magnetic tape in the tape drive.

In order to obtain precise alignment of the transducing gaps in the read head and the write head, the read/write head module in existing manufacturing processes is assembled in a two step process. Typically, the first step of the process is to place the read head and the write head side by side in an assembly fixture where the position of the read and write heads are adjusted so that the respective transducing gaps on the read and write heads are in exact alignment. In addition, the relative vertical alignment of the read head and write head are adjusted so that the face that contains the transducing gaps on the read and write heads are coplanar so that the magnetic tape comes evenly in contact with both the read head and the write head. Once the exact alignment of the read head and write head is accomplished in this assembly fixture, the read and write heads are interconnected by the use of an adhesive to retain the alignment obtained in this assembly step. Once the adhesive has cured, the read/write heads are removed from this assembly fixture and placed in the rectangular shaped opening the read/write head frame. A leaf spring is inserted between the read/write heads and one inner wall of the rectangular shaped read/write head frame such that the adhesively interconnected read/write heads are pressed against the opposite inner wall of the rectangular shaped read/write head frame. The tension of this leaf spring is varied by the use of an adjustable screw that is movable within a threaded aperture through the wall of the rectangular shaped read/write head frame. This screw bears on the center of the convex surface of a leaf spring to vary the amount of force the leaf spring places on the read/write heads as they are forced against the opposite inner wall of the rectangular shaped read/write head frame.

The apparatus and method for assembling magnetic tape drive read/write head modules of the present invention replaces the two step assembly process of the prior art by an assembly fixture that enables a worker to completely assemble and align the read/write head module in a single step process. This is accomplished by providing an assembly fixture that securely holds the rectangular shaped read/write head frame in a fixed position. A read head and write head alignment tool is pivotally attached to the assembly fixture for suspending the read head and write head in the rectangular shaped opening in the read/write head frame in a predetermined position. This alignment tool consists of two parallel arms each of which includes a magnet to magnetically suspend the read head and write head from the bottom of this tool. The worker places the read head and the write head on top of the magnets located on these two parallel arms and then rotates this alignment tool such that the parallel arms are placed in position juxtaposed with two opposite inner walls of the rectangular shaped read/write head frame such that the read head and the write head are suspended in a predefined position within the rectangular shaped opening in the read/write head frame. This alignment tool includes an aperture such that the worker can view the transducing gaps on the read head and the write head for alignment purposes.

Two threaded rods are included in this read/write head module assembly apparatus. The pair of threaded rods are positioned at the ends of the read and write heads, such that they can be used to modify the lateral position of the read head and the write head with respect to the inner walls of the rectangular shaped read/write head frame. By use of the threaded rods, the worker can adjust the relative position of the read head and the write head such that the transducing gaps on these two heads are in exact alignment with respect to each other. The magnets in the parallel arms of the alignment tool maintain the read and write heads in coplanar alignment so that adjustment in all three dimensions is precisely provided. Once the alignment process is completed, a leaf spring is inserted between one inner wall of the rectangular shaped read/write head frame and the read/write heads. An adjusting screw is inserted through a threaded aperture in the wall of the rectangular shaped read/write head frame such that it can be used to adjust the clamping force provided by the leaf spring on the read/write heads. Once the leaf spring is in position and properly adjusted, the worker can apply an adhesive to the read and write heads such that they are secured to each other to maintain the alignment of their transducing gaps. The leaf spring provides continued alignment of the read/write heads with respect to the inner wall of the rectangular shaped read/write head frame.

Thus, this apparatus enables the worker to assembly the magnetic tape drive read/write head modules in a single operation. This apparatus provides precise alignment of the transducing gaps of the read head and write head while also maintaining the top surface of the read and write heads in a coplanar orientation. The use of this apparatus reduces the labor content in the assembly process yet maintains the precision required in the alignment of these heads, thereby significantly reducing the cost of producing the magnetic tape drive read/write head modules. These and other features and advantages of this invention will be ascertained by a reading of the following detailed description.

Read/Write Head Module Assembly Apparatus

Figure 2:
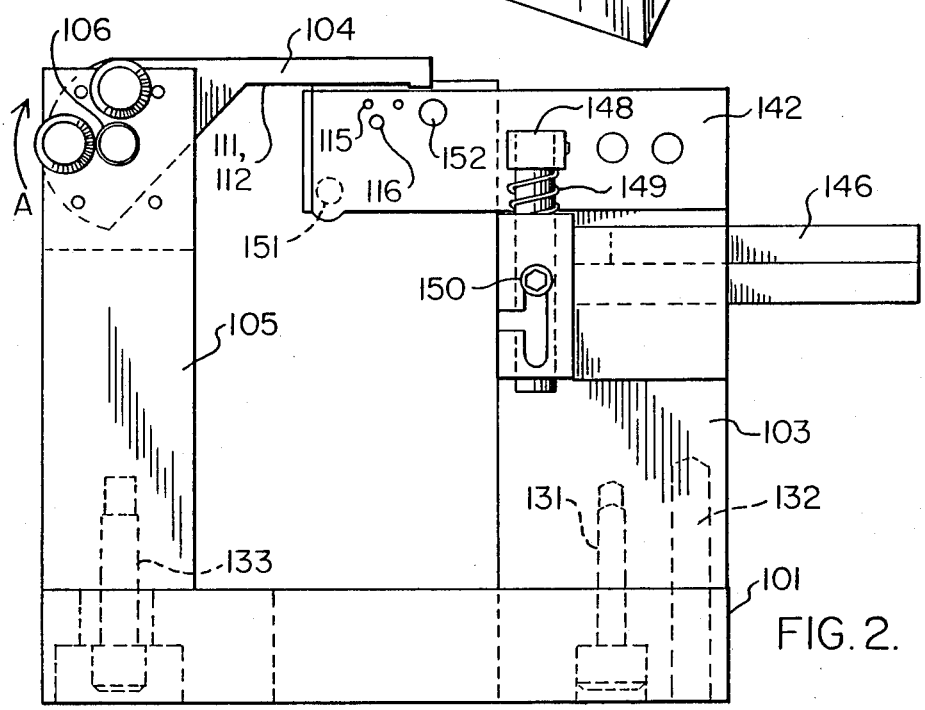
FIG. 2 illustrates a side view of the magnetic tape drive read/write head module assembly apparatus.
Figure 3:
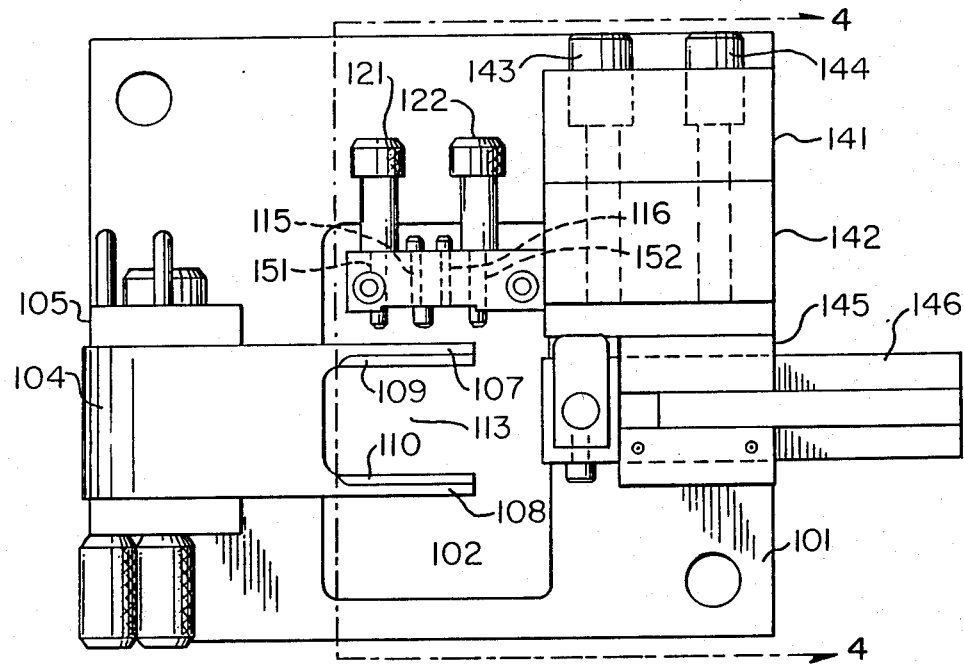
FIG. 3 illustrates the top view of the magnetic tape drive read/write head module assembly apparatus.
Figure 4:
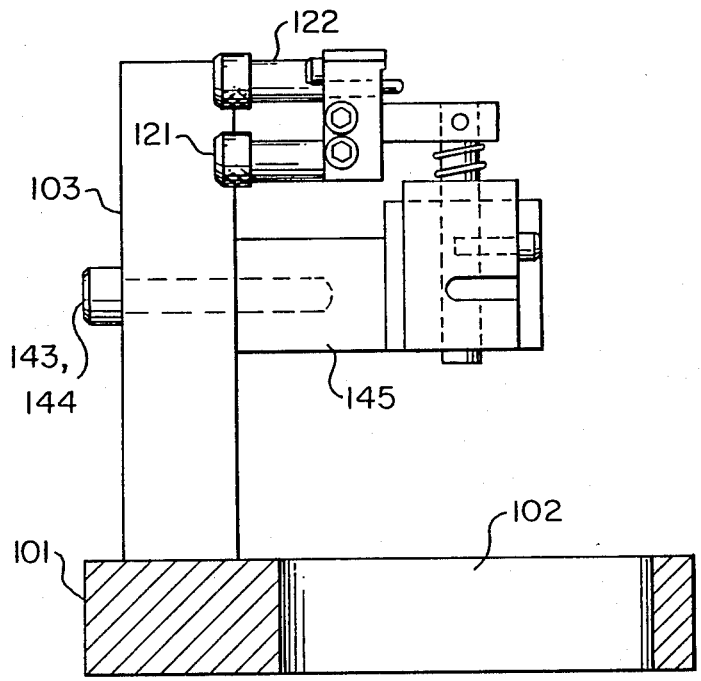
FIG. 4 illustrates an end view of the magnetic tape drive read/write head module assembly apparatus.

FIG. 1 illustrates a perspective view while FIGS. 2, 3, and 4 illustrate side, top and end views of the apparatus for assembling magnetic tape drive read/write head modules. This apparatus includes a base 101 into which is optionally provided an aperture 102, the function of which is described herein below. Attached to base 101 is a frame fixture 103 that functions to securely hold a rectangular shaped read/write head frame 10 in a fixed position for the assembly of the magnetic tape drive read/write head module. Frame fixture 103 is securely fastened to base 101 by, for example, bolts 131, 132 inserted into threaded mating holes in base 101 and frame fixture 103. The rectangular shaped read/write head frame 10 has an opening therein of a rectangular shape into which the read head 11 and write head 12 are positioned and later clamped as part of the assembly process described below.

Frame fixture 103 includes a vertical support member 141 that is secured to base 101 by bolts 131, 132. Vertical support member 141 thereby provides a positionally fixed support for the remaining apparatus of frame fixture 103. Frame adjustment support bracket 145 is attached to vertical support member 141 by bolts 143, 144 and supports frame position adjustment slider 146 which is translatable horizontally in a corresponding track in frame adjustment support bracket 145. An adjustment bolt 147 fastens frame position adjustment slider 146 in the proper horizontal position in the track in frame adjustment support bracket 145. In addition, adjustment bolt 150 controls the vertical position of arm 148, the shaft of which is encircled by spring 149. Thus, by adjusting the horizontal position of frame position adjustment slider 146 and the vertical position of arm 148, the position of read/write head frame support 142 is precisely determined. Read/write head frame support 142 includes threaded holes 151, 152 into which bolts 121, 122 are threaded to secure read/write head frame 10 against the side of read/write head frame support 142.

Frame 105 is securely fastened to base 101 by, for example, bolts 133 inserted in threaded, mating holes in base 101 and frame 105. Frame fixture 103 and frame 105 are, as can be seen in FIG. 1, mounted on the same surface of base 101, standing on opposite sides of aperture 102.

Alignment Tool

Figure 6:
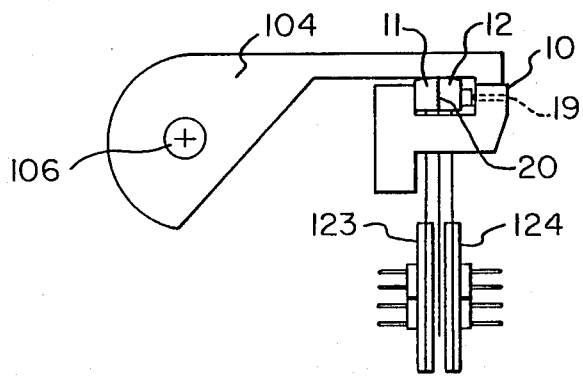
FIG. 6 illustrates a side view of the alignment tool and read/write heads.

Alignment tool 104 is connected by pivot pin 106 to frame 105, such that when alignment tool 104 is pivoted in the clockwise direction (shown by arrow A), the end of the alignment tool 104 comes in contact with the rectangular shaped read/write head frame 10. Alignment tool 104 includes a pair of parallel spaced arms 107, 108 at the end opposite pivot pin 106, each of which includes a magnet 109, 110. The arms 107, 108 each also include a notch or groove 111, 112, respectively, into which the read 11 and write 12 heads are placed (FIG. 6). Thus, the grooves 111, 112 in arms 107, 108 provide for the precise positioning of the read head 11 and the write head 12 that are inserted therein. Magnets 109, 110 magnetically suspend the read head 11 and the write head 12 from the bottom of alignment tool 104, such that when alignment tool 104 is pivoted around pivot pin 106 to come in contact with read/write head frame 10, the read head 11 and the write head 12 that are magnetically suspended from the bottom of alignment tool 104 are placed in the rectangular shaped opening in the read/write head frame 10 in a predetermined properly aligned position. The use of alignment tool 104 with its integral magnets 109, 110 insure that the transducer surfaces of read head 11 and write head 12 remain precisely coplanar with respect to each other. The arms 107, 108 of the alignment tool 104 provide an aperture 113 through which a worker has visual access to the transducer gap surface of read head 11 and write head 12. The worker can thereby view the transducer gaps through aperture 113 and perform an alignment function wherein the relative lateral position of read head 11 and write head 12 are adjusted such that the transducer gaps on these two heads are precisely aligned with respect to each other so that the tracks on the magnetic tape are exactly positioned over a corresponding transducer gap in both the read head 11 and the write head 12.

Read/Write Head Frame

Figure 5:
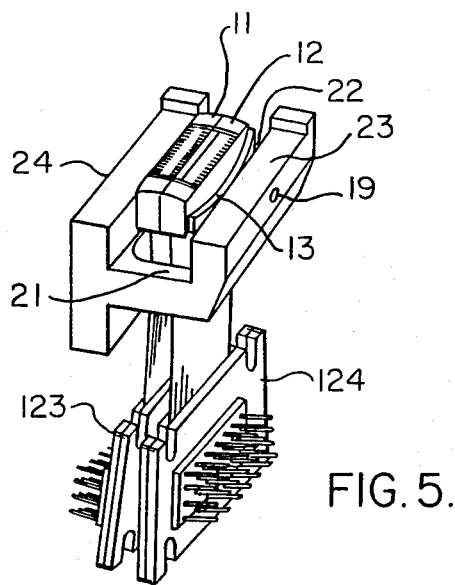
FIG. 5 illustrates a view of the read/write head frame details.

Read/write head frame 10 (FIG. 5) has a top surface that is substantially rectangular in shape, having a rectangular shaped opening therein. The inner walls 21-24 of read/write head frame 10 inside the rectangular shaped opening are used to precisely orient read head 11 and write head 12 in read/write head frame 10. Inner wall 24 is used as the read/write head registration surface and it is against inner wall 24 that read head 11 and write head 12 are secured.

In order to provide the lateral adjustment for the read head 11 and the write head 12, a pair of holes (not shown) are provided in the inner walls 21, 22 of read/write head frame 10 in corresponding mating relationship to the position of threaded rods 115, 116 in read/write head frame support 142. Threaded rods 115, 116 are inserted into these holes and are used to modify the lateral positioning of read head 11 and write head 12 with respect to the inner walls 21, 22 of the rectangular shaped read/write head frame 10. In addition, a threaded hole 19 is provided in a third inner wall 23 of the rectangular shaped read/write head frame 10 such that screw 14 can be threaded through hole 19 to come in contact with leaf spring 13 to thereby adjust the tension of leaf spring 13.

FIG. 6 illustrates a side view of the read head 11, write head 12, read/write head frame 10, alignment tool 104 and the interrelationship thereof. Alignment tool 104 includes a notch 111, 112 cut in the bottom of arms 107, 108 respectively. A tape drive read/write head assembly worker inserts read head 11, write head 12, wither their corresponding connectors 123, 124 up through the rectangular shaped opening in read/write head frame 10 to come into contact with alignment tool !04. The worker manually adjusts the position of read head 11 and write head 12 so that they are right justified (as seen in FIG. 6) against the edge of notches 111, 112. During this preliminary alignment operation, alignment tool 104 may be rotated a short distance in the counterclockwise direction to provide the worker with access to read head 11 and write head 12. The alignment tool 104 is then rotated clockwise to come into contact with read/write head frame 10 as shown in FIG. 6. An alternative to manual insertion of read head 11, write head 12 into position as described above, is the use of a robot mechanism that loads a read head 11, write head 12 through aperture 102 in base 101 into position on alignment tool 104.

Read/Write Head Module Assembly Method

Figure 7:
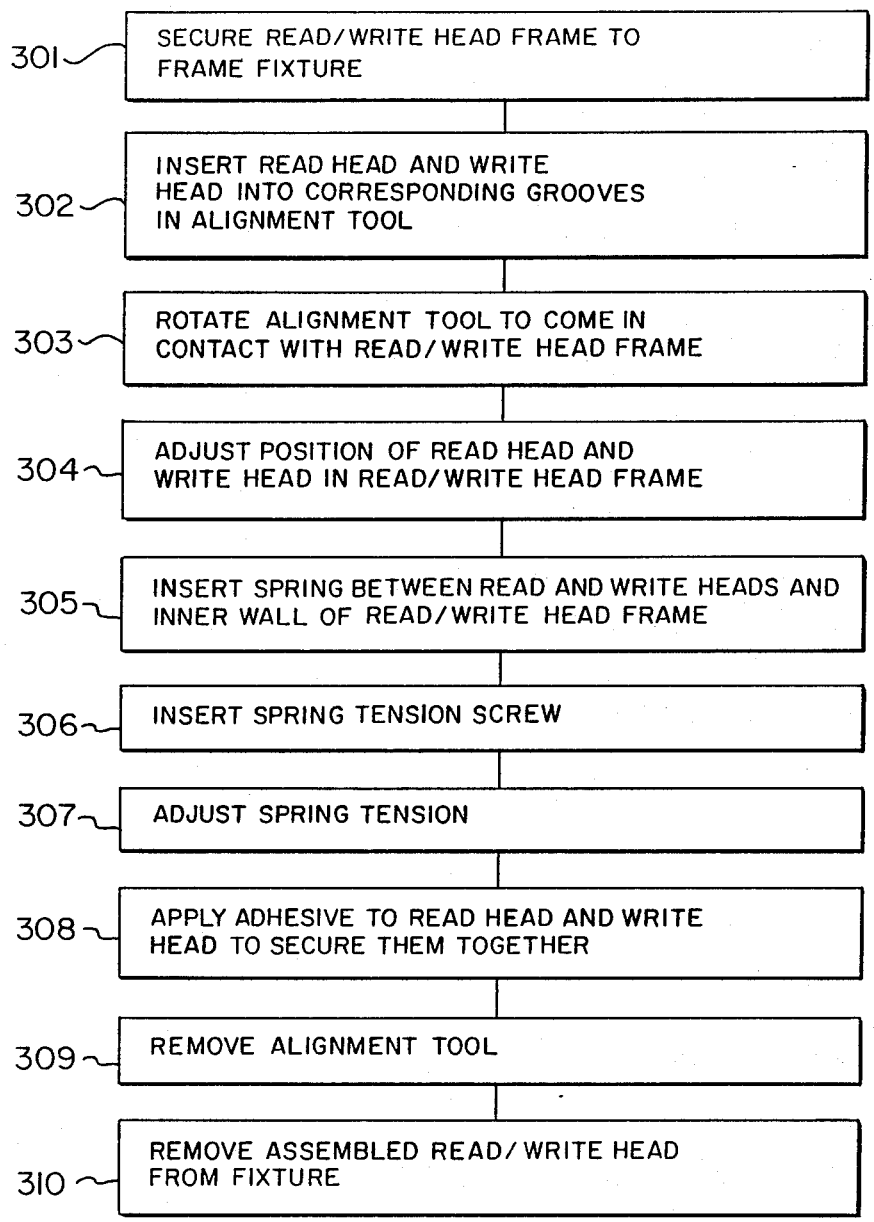
FIG. 7 illustrates in flow diagram form the operational steps required by the use of this apparatus to assemble a magnetic tape drive read/write head module.

In order to better understand the operation of this apparatus, the assembly process is discussed using the flow chart of FIG. 7 to illustrate, step by step, the assembly process for the magnetic tape drive read/write head module. At step 301, frame 10 is securely fastened to frame fixture 103 by the use of threaded rods or bolts 121,122 inserted into threaded mating holes 151,152 in frame fixture 103 and read/write head frame 10. A read head 11 and a write head 12 are inserted at step 302 into the grooves 111, 112 in arms 107, 108 of alignment tool 104. Since the read head 11 and write head 12 are manufactured from a magnetic material, magnets 109 and 110 securely hold read head 11 and write head 12 flush against the surface of the bottom of groove 111, 112 of arms 107, 108 as shown in FIG. 6. Grooves 111, 112 insure that the transducer surfaces of read head 11 and write head 12 remain coplanar and that read head 11 and write head 12 are placed in precise position into the rectangular shaped opening in the rectangular shaped read/write head frame 10. Once the read head 11 and the write head 12 are magnetically affixed to alignment tool 104, at step 303 the worker rotates alignment tool 104 in a clockwise direction until arms 107, 108 of alignment tool 104 come in contact with rectangular shaped read/write head frame 10 and are in juxtaposed position to inner walls 21, 22 of the rectangular shaped read/write head frame 10.

When alignment tool 104 is in this position, read head 11 and write head 12 are magnetically suspended from alignment tool 104 in a predetermined position in the rectangular shaped opening in the rectangular shaped read/write head frame 10. The worker can view the position of read head 11 and write head 12 through aperture 113 of alignment tool 104. This visual inspection by the worker is accomplished by the use of a magnifying instrument such as a microscope or a large magnifying glass (not shown). The worker views the alignment of the transducer gaps on read head 11 and write head 12 and makes use of threaded rods 115,116 placed through holes 15-16 respectively in inner walls 21, 22 of rectangular shaped read/write head frame 10. The worker uses threaded rods 115,116 to modify the lateral positioning of read head 11 and write head 12 such that the transducer gaps on these two heads are precisely aligned with respect to each other. At this point, adjustment in two dimensions of the read and write head have been accomplished since alignment tool 104 maintains the transducer surfaces of read head 11 and write head 12 in a coplanar alignment while threaded rods 115,116 align read head 11 and write head 12 in a lateral direction.

The remaining adjustment is the placement of the read/write heads in proximate relation to inner wall 24 of rectangular shaped read/write head frame 10. This is accomplished by inserting spring 13 at step 305 between read/write heads 11, 12 and the remaining inner wall 23 of the rectangular shaped read/write head frame 10. This leaf spring 13 applies a force to read/write heads 11, 12 to force them up against inner wall 24 of rectangular shaped read/write head frame 10. The clamping force provided by leaf spring 13 is controlled by the use of screw 14 which is inserted through threaded hole 19 in inner wall 23 of rectangular shaped read/write head frame 10. The worker adjusts screw 14 to provide a precisely controlled clamping force to force read/write heads 11, 12 into alignment against inner wall 24 of rectangular shaped read/write head frame 10. The worker at step 308 applies adhesive 20 to read head 11 and write head 12 to secure them to each other and to maintain the precise alignment of the respective transducer gaps to maintain read head 11 and write head 12 in a coplanar relationship. Once adhesive 20 has cured, the worker at step 309 removes alignment tool 104 by rotating alignment tool 104 around pivot 106 in a clockwise direction leaving rectangular shaped read/write head frame 10 with read head 11 and write head 12 securely fastened in the rectangular opening therein by means of spring 13 and screw 14 while adhesive 20 ensures that read head 11 and write head 12 cannot shift position with respect to each other. At step 310, the worker releases the assembled magnetic tape drive read/write head module from frame fixture 103 by rotating threaded rods 121,122.

The function of the aperture 102 in base 101 is that optionally a robot apparatus can be used to place read head 11 and write head 12 into grooves 111, 112 of alignment tool 104 once alignment tool 104 is rotated in the clockwise direction to come in contact with rectangular shaped read/write head frame 10. This partial automation of this process would improve the efficiency of the assembly operation.

While a specific embodiment of this invention has been disclosed it is expected that those skilled in the art can and will devise variations of the disclosed embodiment which variations fall within the scope of the appended claims.

I claim:

1. Apparatus for assembling magnetic tape drive read head and write head modules comprising:
    means for securing a rectangular-shaped read/write head frame, wherein said read/write head frame has a rectangular shaped opening for placing said read head and write head therein;
    means for magnetically suspending a read head and a write head in said rectangular-shaped opening in said read/write head frame;
    means for adjusting the position of said read head and said write head with respect to two opposite inner walls of said read/write head frame;
    means for clamping said positioned read head and write head against a third one of said inner walls of said read/write head frame.

2. The apparatus of claim wherein said magnetically suspending means includes:
    two parallel arms that are positionable juxtaposed with said two opposite inner walls of said read/write head frame.

3. The apparatus of claim 2 wherein said magnetically suspending means includes:
    two magnets, one located on each of said two parallel arms on the side of said two parallel arms facing said two opposite inner walls of said read/write head frame, for holding said read head and write head suspended from said two parallel arms.

4. The apparatus of claim 3 wherein said suspending means further includes:

an aperture located between said two parallel arms for providing visual access to said suspended read head and write head for alignment purposes.

5. The apparatus of claim 4 wherein said magnetically suspending means includes:
means for pivotally attaching said magnetically suspending means to said securing means, for rotatable inserting said read head and write head, suspended from said two parallel arms, into said rectangular opening in said read/write head frame in a predetermined position.

6. The apparatus of claim 1 wherein said adjusting means includes:
two threaded rods, each positioned at an opposite end of said read head, for modifying the position of said read head between said two opposite inner walls of said read/write head frame.

7. The apparatus of claim wherein said adjusting means includes:
two threaded rods, each positioned at an opposite end of said write head, for modifying the position of said write head between said two opposite inner walls of said read/write head frame.

8. The apparatus of claim 1 wherein said clamping means includes:
spring means positioned between and in contact with said read/write heads and a fourth inner wall of said read/write head frame for forcing said read/write heads against said third inner wall of said read/write head frame.

9. The apparatus of claim 8 wherein said clamping means further includes:
means for adjusting the force applied by said spring means to said read/write heads.

10. Apparatus for assembling magnetic tape drive read head and write head modules comprising:
means for securing an integral rectangular-shaped read/write head frame made of a nonmagnetic material, wherein said read/write head frame has a rectangular shaped opening for placing said read head and write head therein;
means for magnetically suspending a read head and a write head in said rectangular-shaped opening in said read/write head frame, including:
two parallel arms that are positionable juxtaposed with said two opposite inner walls of said read/write head frame,
two magnets, one located on each of said two parallel arms on the side of said two parallel arms facing said two opposite inner walls of said read/write head frame, for holding said read head and write head suspended from said two parallel arms,
an aperture located between said two parallel arms for providing visual access to said suspended read head and write head for alignment purposes,
means for pivotally attaching said magnetically suspending means to said securing means, for rotatable inserting said read head and write head, suspended from said two parallel arms, into said rectangular opening in said read/write head frame in predetermined position;
means for adjusting the position of said read head and said write head with respect to two opposite inner walls of said read/write head frame, including:
two threaded rods, each positioned at an opposite end of said read head, for modifying the position of said read head between said two opposite inner walls of said read/write head frame,
two threaded rods, each positioned at an opposite end of said write head, for modifying the position of said write head between said two opposite inner walls of said read/write head frame;
means for clamping said positioned read head and write head against a third one of said inner walls of said read/write head frame, including:
spring means positioned between and in contact with said read/write heads and a fourth inner wall of said read/write head frame for forcing said read/write heads against said third inner walls of said read/write head frame,
spring means positioned between and in contact with said read/write heads and a fourth inner wall of said read/write head frame for forcing said read/write heads against said third inner wall of said read/write head frame.

* * * * *